US011615183B2

(12) United States Patent
Ito et al.

(10) Patent No.: US 11,615,183 B2
(45) Date of Patent: Mar. 28, 2023

(54) INFORMATION PROCESSING DEVICE, CONTROL METHOD, AND RECORDING MEDIUM FOR DETECTING AN ANOMALY IN BEHAVIOR OF AN APPLICATION OPERATING ON A DEVICE IN A MOBILITY

(71) Applicant: Panasonic Intellectual Property Management Co., Ltd., Osaka (JP)

(72) Inventors: Takayoshi Ito, Osaka (JP); Kento Tamura, Osaka (JP); Yoshiharu Imamoto, Kanagawa (JP); Junichi Tsurumi, Osaka (JP); Hiroyuki Wada, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/825,709

(22) Filed: May 26, 2022

(65) Prior Publication Data

US 2022/0284092 A1 Sep. 8, 2022

Related U.S. Application Data

(63) Continuation of application No. PCT/JP2020/032015, filed on Aug. 25, 2020.

(30) Foreign Application Priority Data

Dec. 5, 2019 (JP) .............................. JP2019-220231

(51) Int. Cl.
*G06F 21/55* (2013.01)
*G06F 21/56* (2013.01)

(52) U.S. Cl.
CPC .......... *G06F 21/554* (2013.01); *G06F 21/552* (2013.01); *G06F 21/56* (2013.01); *G06F 21/561* (2013.01); *G06F 2221/2151* (2013.01)

(58) Field of Classification Search
CPC ...... G06F 21/554; G06F 21/552; G06F 21/56; G06F 21/561; G06F 2221/2151; G06F 11/07; G06F 21/54; G05B 23/02
See application file for complete search history.

(56) References Cited

U.S. PATENT DOCUMENTS 7,690,034 B1 * 3/2010 Sallam ................. H04L 63/145
726/25
9,098,333 B1 * 8/2015 Obrecht .................... G06F 9/50
(Continued)

FOREIGN PATENT DOCUMENTS

JP 2010-182019 8/2010
JP 2012-022380 2/2012
(Continued)

OTHER PUBLICATIONS

International Search Report (ISR) and Written Opinion (WO) from International Searching Authority (Japan Patent Office) in International Pat. Appl. No. PCT/JP2020/032015, dated Nov. 17, 2020.
(Continued)

*Primary Examiner* — Aravind K Moorthy
(74) *Attorney, Agent, or Firm* — Greenblum & Bernstein, P.L.C.

(57) ABSTRACT

An information processing device includes: a storage that stores determination criterion information indicating a determination criterion for determining whether or not a behavior of an application operating on a device provided to a vehicle is normal; and a detector that obtains behavior information indicating the behavior of the application, and detects an anomaly in the behavior of the application, based on (i) state information that indicates a state of the mobility and is obtained via the mobility network and (ii) the behavior information obtained and the determination criterion information stored in the storage.

4 Claims, 14 Drawing Sheets

(56) References Cited

U.S. PATENT DOCUMENTS

| | | | |
|---|---|---|---|
| 9,141,786 B2* | 9/2015 | Edery | G06F 21/53 |
| 9,154,516 B1* | 10/2015 | Vaystikh | H04L 63/1425 |
| 9,219,755 B2* | 12/2015 | Touboul | H04L 63/20 |
| 10,365,377 B1* | 7/2019 | Liu | H04W 64/00 |
| 10,459,827 B1* | 10/2019 | Aghdaie | G06N 20/00 |
| 10,540,498 B2* | 1/2020 | Li | G06F 11/3089 |
| 10,673,880 B1* | 6/2020 | Pratt | H04L 63/1433 |
| 10,936,717 B1* | 3/2021 | Herman Saffar | H04L 63/1408 |
| 11,075,929 B1* | 7/2021 | Li | G06N 20/20 |
| 11,240,205 B1* | 2/2022 | Ramesh | H04L 63/101 |
| 11,442,803 B2* | 9/2022 | Cherbakov | G06F 11/0748 |
| 2009/0204964 A1* | 8/2009 | Foley | G06F 21/53 718/1 |
| 2015/0242635 A1* | 8/2015 | Li | G06F 21/554 726/25 |
| 2015/0373023 A1* | 12/2015 | Walker | G06F 21/6218 726/3 |
| 2016/0127367 A1* | 5/2016 | Jevans | H04W 12/10 713/152 |
| 2017/0024560 A1* | 1/2017 | Linde | G06F 21/305 |
| 2017/0091008 A1* | 3/2017 | Cherbakov | G06N 20/00 |
| 2018/0359789 A1* | 12/2018 | Yang | H04W 76/28 |
| 2019/0313297 A1* | 10/2019 | Lee | H04W 36/0061 |
| 2020/0005193 A1* | 1/2020 | Nie | G06F 11/0709 |
| 2020/0037391 A1* | 1/2020 | Cui | H04W 76/38 |
| 2020/0050744 A1* | 2/2020 | Hazan | G06N 20/00 |
| 2020/0178172 A1* | 6/2020 | Thangarasa | H04W 52/0216 |
| 2020/0195321 A1* | 6/2020 | Black | H04B 7/0408 |
| 2020/0242417 A1* | 7/2020 | Sagi | G06K 9/6282 |
| 2020/0314133 A1* | 10/2020 | Singh | G06F 21/604 |
| 2020/0371897 A1* | 11/2020 | Hansmann | G06F 11/3476 |
| 2021/0075799 A1* | 3/2021 | Pularikkal | G06F 21/52 |
| 2021/0158193 A1* | 5/2021 | Davis | G06N 5/045 |
| 2021/0306361 A1 | 9/2021 | Tanaka et al. | |

FOREIGN PATENT DOCUMENTS

| | | |
|---|---|---|
| JP | 2015-088948 | 5/2015 |
| WO | 2017/081985 | 5/2017 |
| WO | 2020/075800 | 4/2020 |

OTHER PUBLICATIONS

English language translation of International Search Report (ISR) and Written Opinion (WO) from International Searching Authority (Japan Patent Office) in International Pat. Appl. No. PCT/JP2020/032015, dated Nov. 17, 2020.

* cited by examiner

FIG. 2

| Timestamp | Process name | Process ID | Hook pointer name | Hook pointer attribute 1 | Hook pointer attribute 2 | .... |

FIG. 3

| Timestamp | Vehicle speed | Acceleration | Steering angle | ···· |

FIG. 4A

| Timestamp | Communicator name | Communicator attribute 1 | Communicator attribute 2 | Communicator attribute 3 | ... |

FIG. 6

| Timestamp | Behavior log information ||||||| State log information |||
|---|---|---|---|---|---|---|---|---|---|
| | The number of occurrences of hook pointer A | The number of occurrences of hook pointer B | The number of occurrences of hook pointer C | The number of occurrences of hook pointer D | Communication message A | Communication message B | Vehicle speed [km/h] | Acceleration [m/s²] | Steering angle [deg] |
| 0.1 | 10 | 0 | 2 | 5 | — | 5 | 78 | 2 | 1 |
| 0.2 | 18 | 2 | 2 | 3 | — | 3 | 80 | -1 | -2 |
| 0.3 | 0 | 0 | 3 | 0 | — | 5 | 79 | 0 | 0 |
| 0.4 | 1 | 0 | 8 | 0 | Instruction for emergency brake | 3 | 79 | -25 | 30 |

| Event 1 | Normal behavior log information | Normal state log information | |
|---|---|---|---|
| Event 2 | Normal behavior log information | Normal state log information | |
| Event 3 | Normal behavior log information | Normal state log information | |
| ⋮ | ⋮ | ⋮ | |
| Event n | Normal behavior log information | Normal state log information | "Normal" |

Behavior log information / State log information

| | | | Behavior log information | | | State log information | | |
|---|---|---|---|---|---|---|---|---|
| | Timestamp | Process ID | Hook pointer name | Hook pointer attribute 1 | Hook pointer attribute 2 | Vehicle speed [km/h] | Acceleration [m/s²] | Steering angle [deg] |
| Event 1 | 0.120 | 1125 | task_create | - | - | 0 | 0 | 0 |
| | 0.123 | 1125 | file_permission | fileA | read | 0 | 0 | 0 |
| | 0.126 | 1125 | mmap_addr | addr1 | - | 0 | 0 | 0 |
| | 0.128 | 1125 | file_ioctl | Communication device | Data transmission | 0 | 0 | 0 |
| | 0.130 | 1125 | task_free | - | - | ... | ... | ... |
| Event 2 | 1854.1254 | 2565 | task_create | - | - | 56 | 0 | 1 |
| | 1854.1354 | 2565 | file_permission | fileB | write | 56 | 0 | 1 |
| | 1854.1454 | 2565 | mmap_addr | addr1 | - | 56 | 1 | -2 |
| | 1854.1600 | 2565 | task_free | 8 | 0 | 55 | 0 | 0 |
| | | | | ... | | | | |
| Event 3 | 2152.120 | 6548 | task_create | - | - | 56 | 0 | 1 |
| | 2152.123 | 6548 | file_permission | fileA | read | 56 | 0 | 1 |
| | 2152.126 | 6548 | mmap_addr | addr1 | - | 56 | 1 | -2 |
| | 2152.128 | 6548 | file_ioctl | Communication device | Data transmission | 57 | -2 | 0 |
| | 2152.130 | 6548 | task_free | 8 | 0 | 55 | 0 | 0 |

(b)

| | Normal behavior log information | | | | Normal state log information | | |
|---|---|---|---|---|---|---|---|
| Rule Timestamp | Process ID | Hook pointer name | Hook pointer attribute 1 | Hook pointer attribute 2 | Vehicle speed [km/h] | Acceleration [m/s²] | Steering angle [deg] |
| <20 | - | task_create | - | - | 0 | - | - |
| <20 | - | file_permission | fileA | read | 0 | - | - |
| <20 | - | mmap_addr | addr1 | - | 0 | - | - |
| <20 | - | file_ioctl | Communication device | Data transmission | 0 | - | - |
| <20 | - | task_free | - | - | | | |

INFORMATION PROCESSING DEVICE, CONTROL METHOD, AND RECORDING MEDIUM FOR DETECTING AN ANOMALY IN BEHAVIOR OF AN APPLICATION OPERATING ON A DEVICE IN A MOBILITY

CROSS REFERENCE TO RELATED APPLICATIONS

This is a continuation application of PCT International Application No. PCT/JP2020/032015 filed on Aug. 25, 2020, designating the United States of America, which is based on and claims priority of Japanese Patent Application No. 2019-220231 filed on Dec. 5, 2019.

FIELD

The present disclosure relates to an information processing device, a control method, and a recording medium.

BACKGROUND

Patent Literature (PTL) 1 discloses an anomaly detecting device that detects an anomaly caused by a computer virus, such as a bot. The anomaly detecting device according to PTL 1 monitors file accesses and the like by processes with Linux (R) Security Module (LSM); for example, if a process accesses a file other than files that the process is to access, the anomaly detecting device determines that an anomaly has been caused by a computer virus.

CITATION LIST

Patent Literature

PTL 1:
Japanese Unexamined Patent Application Publication No. 2010-182019

SUMMARY

However, the above-described anomaly detecting device has a room for improvement. The present disclosure therefore provides an information processing device, a control method, and a recording medium that can attain further improvement.

In accordance with an aspect of the present disclosure, an information processing device that is connected to a mobility network provided to a mobility includes: a storage that stores determination criterion information indicating a determination criterion for determining whether or not a behavior of an application operating on a device provided to the mobility is normal; and a detector that obtains behavior information indicating the behavior of the application, and detects an anomaly in the behavior of the application, based on the behavior information obtained and the determination criterion information stored in the storage.

General or specific aspects of the present disclosure may be implemented to a system, a method, an integrated circuit, a computer program, a computer-readable recording medium such as a Compact Disc-Read Only Memory (CD-ROM), or any given combination thereof.

With the information processing device and the like according to an aspect of the present disclosure, it is possible to attain further improvement.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 2 is a diagram illustrating an example of behavior log information according to Embodiment 1.

FIG. 3 is a diagram illustrating an example of state log information according to Embodiment 1.

FIG. 4A is a diagram illustrating another example of the state log information according to Embodiment 1.

FIG. 6 is a diagram illustrating an example of the behavior log information and the state log information that are obtained by the detector of the information processing device according to Embodiment 1.

FIG. 11 is a diagram illustrating an example of behavior log information and state log information that are obtained by a detector of the information processing device according to Embodiment 2 and determination criterion information stored in a storage of the information processing device.

Figure 1:
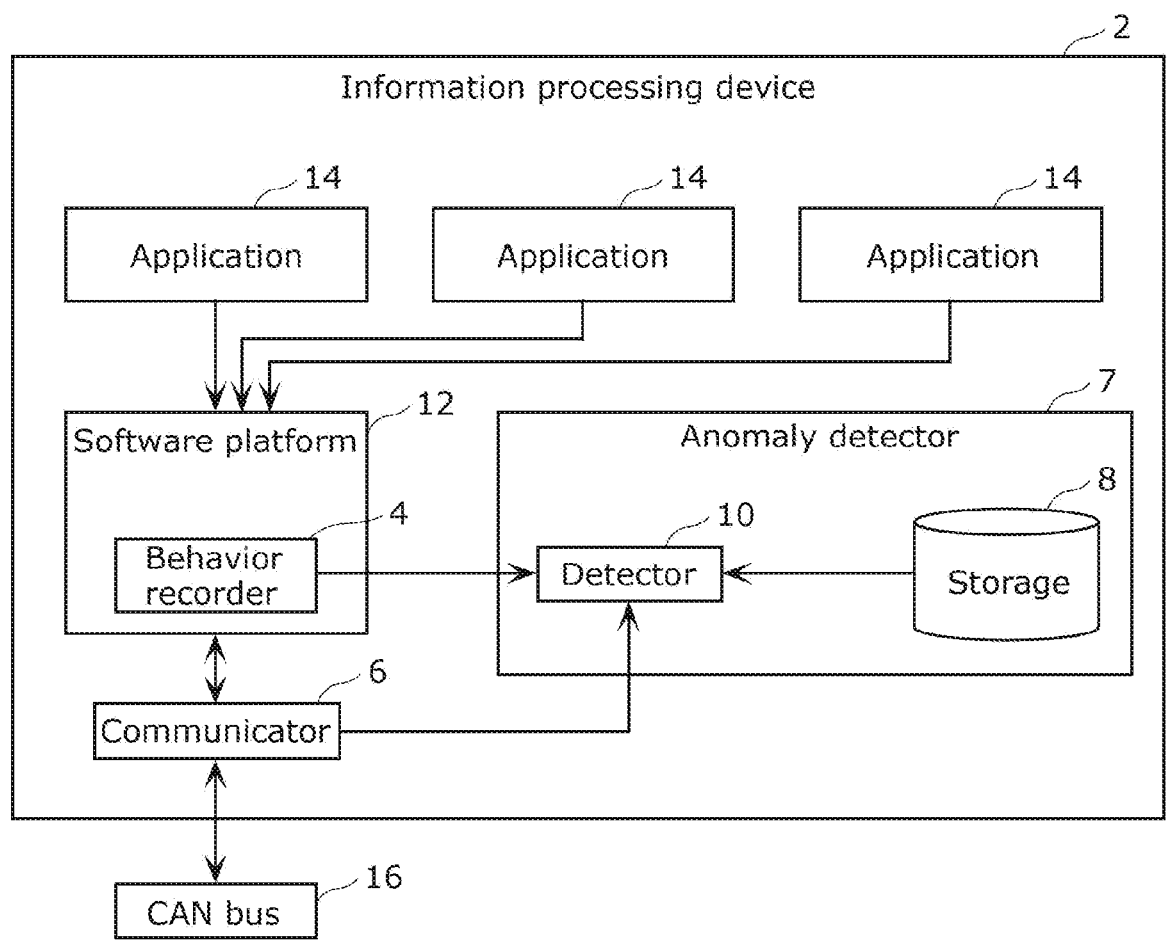
FIG. 1 is a block diagram illustrating a configuration of an information processing device according to Embodiment 1.

DESCRIPTION OF EMBODIMENTS (Observation Based on which the Present Disclosure has been Made)

The inventors of the present disclosure found the following problem of the anomaly detection device described in "Background".

In recent years, the development of driving automation systems for automatically performing driving operations such as speed increasing and decreasing, steering, and controlling has been progressed. Such driving automation systems have a risk, for example, that a malicious third party would attack a vehicle by transmitting an authorized Controller Area Network (CAN) message to an Electronic Control Unit (ECU) provided to the vehicle. The above-described anomaly detection device of PTL1 is not conceived in consideration of such attack to a vehicle and therefore has a problem that security measures for the vehicle are not sufficient.

In order to solve the above problem, in accordance with an aspect of the present disclosure, an information processing device that is connected to a mobility network provided to a mobility includes: a storage that stores determination criterion information indicating a determination criterion for determining whether or not a behavior of an application operating on a device provided to the mobility is normal; and a detector that obtains behavior information indicating the behavior of the application, and detects an anomaly in the behavior of the application, based on (i) state information that indicates a state of the mobility and is obtained via the mobility network and (ii) the behavior information obtained and the determination criterion information stored in the storage.

According to the aspect, the detector obtains the behavior information indicating a behavior of the application, and detects an anomaly in the behavior of the application, based on the state information, the behavior information obtained, and the determination criterion information stored in the storage. This makes it possible to further reliably detect an anomaly in a behavior of such an application caused by an attack on a mobility, so that security measures for the mobility can be further enhanced.

For example, it is possible that the determination criterion information includes one of a rule-based model and a machine learning model as a determination model for the detecting of the anomaly in the behavior of the application, the one of the rule-based model and the machine learning model being models regarding at least one of the behavior of the application or the state of the mobility, and the detector detects the anomaly in the behavior of the application by applying the determination model to the behavior information and the state information.

According to the aspect, it is possible to detect an anomaly in a behavior of the application with high precision by applying the determination model that is a rule-based model or a machine learning model to the behavior information and the state information.

For example, it is possible that the determination criterion information includes normal behavior log information indicating a history of normal behaviors of the application and normal state log information indicating a history of normal states of the mobility, and the detector detects the anomaly in the behavior of the application by comparing a history of the behavior information with the normal behavior log information included in the determination criterion information and comparing a history of the state information with the normal state log information included in the determination criterion information.

According to the aspect, the determination criterion information enables a normal behavior of the application to be defined for each state of the mobility. As a result, the detector can detect an anomaly in a behavior of the application with high precision by comparing a history of the behavior information with the normal behavior log information included in the determination criterion information and comparing a history of the state information with the normal state log information included in the determination criterion information.

For example, it is possible that the determination criterion information includes anomalous behavior log information indicating a history of anomalous behaviors of the application and anomalous state log information indicating a history of anomalous states of the mobility, and the detector detects the anomaly in the behavior of the application by comparing a history of the behavior information with the anomalous behavior log information included in the determination criterion information and comparing a history of the state information with the anomalous state log information included in the determination criterion information.

According to the aspect, the determination criterion information enables an anomalous behavior of the application to be defined for each state of the mobility. As a result, the detector can detect an anomaly in a behavior of the application with high precision by comparing a history of the behavior information with the anomalous behavior log information included in the determination criterion information and comparing a history of the state information with the anomalous state log information included in the determination criterion information.

For example, it is possible that the determination criterion information includes a determination model that is generated in advance by machine learning to be used in determining a likelihood that the behavior of the application is normal, the detector: calculates, using the determination model, (i) a first feature amount from a history of the behavior information obtained and (ii) a second feature amount from a history of the state information obtained; calculates an evaluation value indicating the likelihood from the first feature amount calculated and the second feature amount calculated; and compares the likelihood indicated by the evaluation value with a threshold to detect the anomaly in the behavior of the application.

According to the aspect, using the determination model that is machine-learned and included in the determination criterion information, the detector can detect an anomaly in a behavior of the application with high precision.

For example, it is possible that the information processing device further includes: an estimator that estimates the state of the mobility based on the state information, wherein the detector detects the anomaly in the behavior of the application with further consideration to a result of the estimation performed by the estimator.

According to the aspect, the detector can detect an anomaly in a behavior of the application with high precision with further consideration to a result of the estimation performed by the estimator.

For example, it is possible that the information processing device further includes: a notifier that notifies an outside of the information processing device that the detector detects the anomaly in the behavior of the application, when the detector detects the anomaly.

According to the aspect, since the notifier notifies the outside of an anomaly in a behavior of the application, it is possible to quickly perform an action such as forcibly stopping the application.

In accordance with another aspect of the present disclosure, a control method performed by an information processing device that is connected to a mobility network provided to a mobility includes: obtaining behavior information indicating a behavior of an application operating on a device provided to the mobility; and detecting an anomaly in the behavior of the application based on (i) state information that indicates a state of the mobility and is obtained via the mobility network and (ii) the behavior information obtained in the obtaining and determination criterion information stored in advance in a storage, the determination criterion information indicating a determination criterion for determining whether or not the behavior of the application is normal.

According to the aspect, the behavior information indicating a history of behaviors of the application is obtained, an anomaly in the behavior of the application is detected based on the state information, the behavior information obtained, and the determination criterion information stored in the storage. This makes it possible to further reliably detect an anomaly in a behavior of such an application caused by an attack on a mobility, so that security measures for the mobility can be further enhanced.

In accordance with still another aspect of the present disclosure, a non-transitory computer-readable recording medium having recorded thereon a program for causing a computer to execute the above-described control method.

General or specific aspects of the present disclosure may be implemented to a system, a method, an integrated circuit, a computer program, a computer-readable recording medium such as a Compact Disc-Read Only Memory (CD-ROM), or any given combination thereof.

Hereinafter, certain exemplary embodiments will be described in detail with reference to the accompanying Drawings.

The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment 1

[1. Configuration of Information Processing Device]

Figure 4B:
FIG. 4B is a diagram illustrating still another example of the state log information according to Embodiment 1.

First, a configuration of information processing device 2 according to Embodiment 1 will be described with reference to FIG. 1 to FIG. 4B. FIG. 1 is a block diagram illustrating the configuration of information processing device 2 according to Embodiment 1. FIG. 2 is a diagram illustrating an example of behavior log information according to Embodiment 1. FIG. 3 is a diagram illustrating an example of state log information according to Embodiment 1. FIG. 4A and FIG. 4B are diagrams each illustrating another example of the state log information according to Embodiment 1.

Information processing device 2 of the present embodiment is provided to, for example, a vehicle such as an automobile (an example of a mobility). The vehicle is provided with a driving automation system for performing control to automate driving operations of the vehicle such as acceleration/deceleration, steering, and braking.

As illustrated in FIG. 1, information processing device 2 includes behavior recorder 4, communicator 6, and anomaly detector 7.

Behavior recorder 4 records behavior log information indicating a history of behaviors of each of a plurality of applications 14 that operate on software platform 12. It should be noted that the behavior log information is an example of a history of behavior information indicating behaviors of an application. Behavior recorder 4 collects and records pieces of behavior log information by, for example, hooking system call processes that a process issues to an operating system (OS). Behavior recorder 4 outputs the behavior log information recorded to detector 10.

It should be noted that applications 14 are each an application program that operates on, for example, an in-vehicle device of a vehicle (an example of a device). Specifically, applications 14 are driving automation applications and the like for implementing a) a video distribution application for distributing videos, b) an advertisement distribution application that operates in the background and is for presenting an advertisement to a user, c) a delivery box application for using a trunk of a vehicle as a delivery box, d) a carsharing application for using a carsharing service, e) a ridesharing application for using a ridesharing service, and f) an advanced driver assistance system (ADAS).

Software platform 12 is a virtual machine operating on, for example, a hypervisor and functions as a mobility service platform. Virtual machines that operate on a hypervisor include, in addition to the virtual machine for a mobility service platform described above, a virtual machine for an ADAS, for example.

Here, an example of the behavior log information recorded by behavior recorder 4 will be described with reference to FIG. 2. In the example illustrated in FIG. 2, the behavior log information includes a) Timestamp, b) Process name, c) Process ID (Identification), d) Hook pointer name, e) Hook pointer attribute 1, and f) Hook pointer attribute 2. The timestamp is information indicating a time point at which a piece of the behavior log information is recorded. The process name and the process ID are information indicating a process that issues a system call process to the OS. The hook pointer name and the hook pointer attributes are information indicating a system call process that a process issues to the OS.

Referring back to FIG. 1, communicator 6 is connected to CAN bus 16 (an example of a mobility network) and receives, from CAN bus 16, state log information indicating a history of states of the vehicle. It should be noted that the state log information is an example of a history of state information indicating a state of the vehicle. Communicator 6 outputs the state log information received to detector 10. CAN bus 16 is an in-vehicle network for communicating a CAN message conforming to a CAN protocol and is provided to the vehicle.

Here, an example of the state log information received by communicator 6 will be described with reference to FIG. 3. In the example illustrated in FIG. 3, the state log information includes a) Timestamp, b) Vehicle speed, c) Acceleration, and d) Steering angle. The timestamp is information indicating a time point at which a piece of the state log information is recorded. The vehicle speed is information indicating a speed of the vehicle. The acceleration is information indicating an acceleration of the vehicle. The steering angle is information indicating a steering angle of a steering wheel of the vehicle. It should be noted that the vehicle speed, the acceleration, the steering angle, and the like are obtained by various sensors provided to the vehicle.

In addition to the example described above, the state log information may include, for example, a) Timestamp, b) Communicator name, c) Communicator attribute 1, d) Communicator attribute 2, and e) Communicator attribute 3, as illustrated in FIG. 4A. Alternatively, the state log information may include, for example, a) Timestamp, b) ID field, and c) Data field, as illustrated in FIG. 4B.

Referring back to FIG. 1, anomaly detector 7 includes storage 8 and detector 10. Storage 8 stores in advance determination criterion information indicating a determination criterion for determining whether or not a behavior of application 14 is normal. In the present embodiment, the determination criterion information includes a determination model, which is a machine learning model generated in advance by machine learning to be used in determining a likelihood that the behavior of application 14 is normal. It should be noted that the present embodiment is configured such that a normal behavior is defined (learned) for each individual application 14; however, the defining of a normal behavior is not limited to this, and a normal behavior may be defined for each application group including a plurality of applications 14 related to one another or may be defined on a basis of a system including information processing device 2.

Detector 10 obtains the behavior log information from behavior recorder 4 and the state log information from communicator 6. Based on the behavior log information obtained and the state log information obtained as well as the determination criterion information stored in storage 8, detector 10 detects an anomaly in a behavior of application 14. Specifically, detector 10 uses the determination model included in the determination criterion information to calculate a first feature amount of the behavior log information obtained and a second feature amount of the state log information obtained. Detector 10 detects an anomaly in a behavior of application 14 by calculating, from the first feature amount calculated and the second feature amount calculated, an evaluation value indicating a likelihood that the behavior of application 14 is normal and by comparing the likelihood indicated by the evaluation value with a threshold.

[1-2. Operation by Detector]

Figure 5:
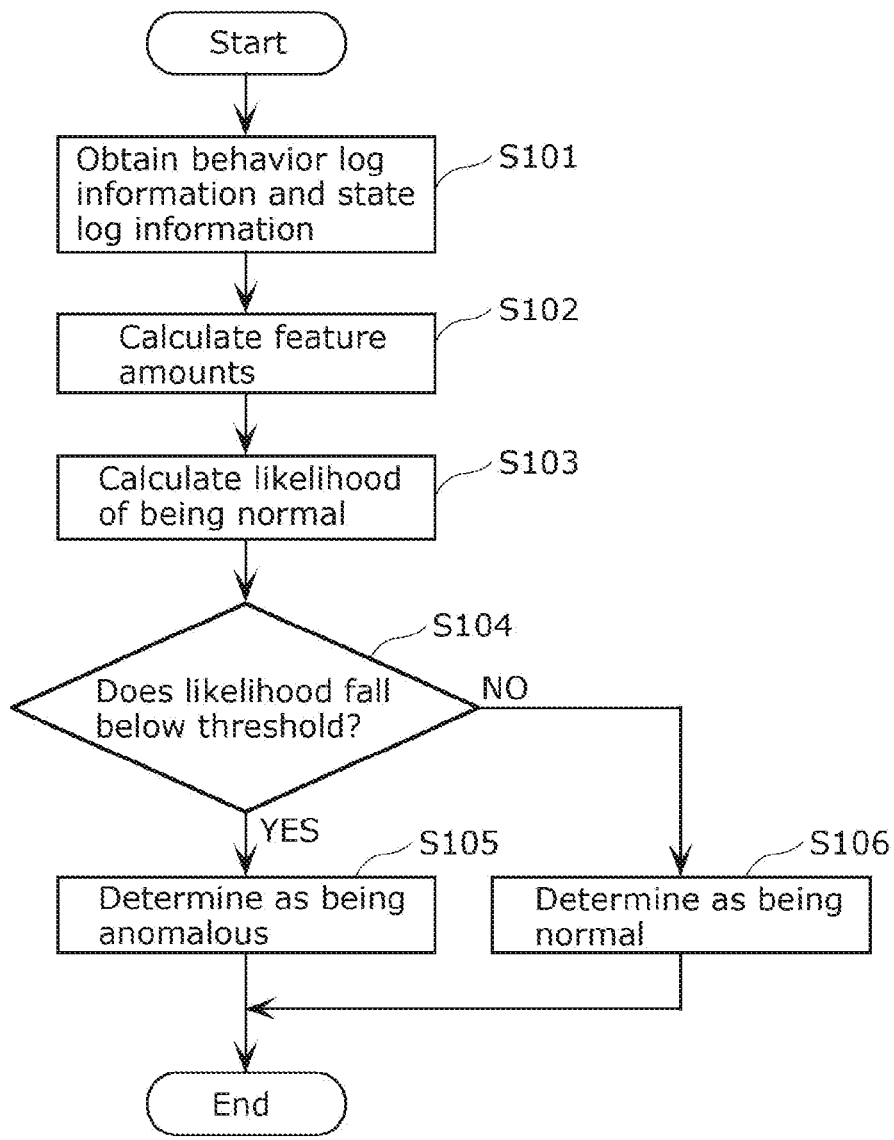
FIG. 5 is a flowchart indicating a flow of an operation by a detector of the information processing device according to Embodiment 1.
Figure 7:
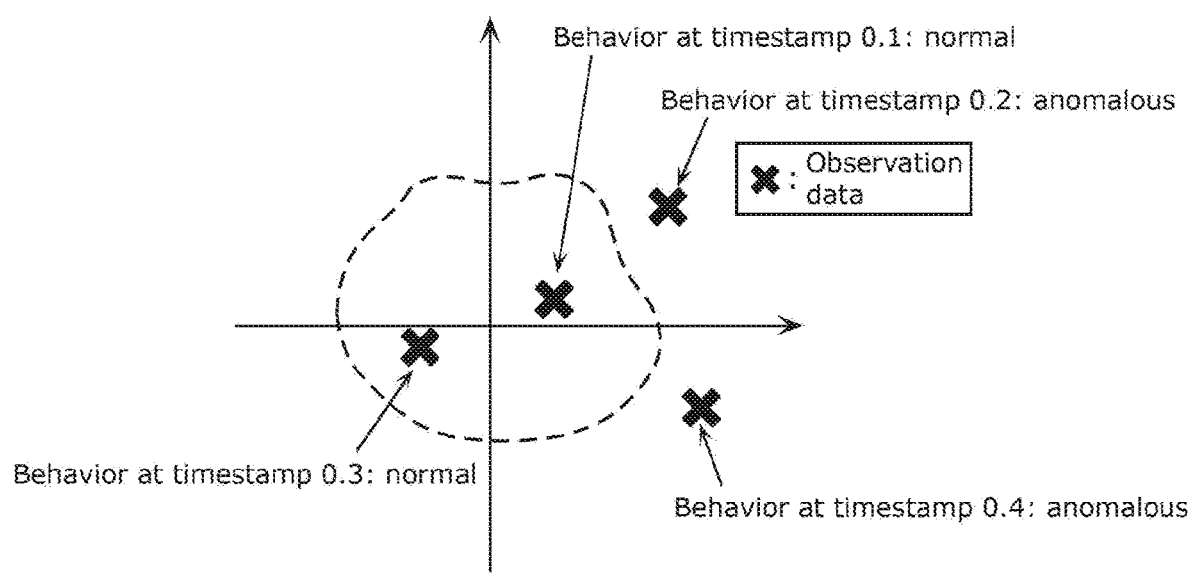
FIG. 7 is a schematic diagram for describing processing in step S104 of the flowchart in FIG. 5.

Next, an operation by detector 10 will be described with reference to FIG. 5 to FIG. 7. FIG. 5 is a flowchart indicating a flow of the operation by detector 10 of information processing device 2 according to Embodiment 1. FIG. 6 is a diagram illustrating an example of the behavior log information and the state log information that are obtained by detector 10 of information processing device 2 according to Embodiment 1. FIG. 7 is a schematic diagram for describing processing in step S104 of the flowchart in FIG. 5.

The following description is about a case where application 14 is a video distribution application and where a malicious third person exploits a vulnerability of application 14 and illegally takes process control of application 14 (i.e., hacking) when the vehicle is traveling on an expressway at about 80 km/h. In this case, application 14 being illegally taken over issues, to communicator 6, an application programming interface (API) for instructions to transmit a CAN message to apply an emergency brake (hereinafter, referred to as "emergency brake API"). This involves a risk that an emergency brake is activated unexpectedly when the vehicle is traveling on the expressway. As a precondition, the emergency brake API is supposed to be issued only in an emergency situation when the vehicle is traveling at low speed.

As illustrated in FIG. 5, detector 10 obtains the behavior log information from behavior recorder 4 and the state log information from communicator 6 (S101). Here, detector 10 obtains, for example, behavior log information and state log information as illustrated in FIG. 6 every 0.1 sec. In the example illustrated in FIG. 6, the behavior log information includes a) Timestamp, b) The number of occurrences of hook pointer A, c) The number of occurrences of hook pointer B, d) The number of occurrences of hook pointer C, e) The number of occurrences of hook pointer D, f) Communication message A, and g) Communication message B. The state log information includes a) Timestamp, b) Vehicle speed, c) Acceleration, and d) Steering angle.

Detector 10 uses the determination model included in determination criterion information stored in storage 8 to calculate a first feature amount of the behavior log information obtained and a second feature amount of the state log information obtained (S102). Detector 10 calculates an evaluation value indicating a likelihood that a behavior of application 14 is normal, from the first feature amount calculated and the second feature amount calculated (S103).

Detector 10 compares the evaluation value (likelihood of normality) with the threshold (S104) to determine whether or not the behavior of application 14 is anomalous. For example, detector 10 determines whether or not the behavior of application 14 is anomalous every 0.1 sec in what is called a time-driven manner.

If the likelihood indicated by the evaluation value falls below the threshold (YES in S104), detector 10 determines that the behavior of application 14 is anomalous (S105). If the likelihood indicated by the evaluation value does not fall below the threshold (NO in S104), detector 10 determines that the behavior of application 14 is normal (S106).

Here, the processing in step S104 described above will be described in detail with reference to FIG. 6 and FIG. 7. Detector 10 uses the behavior log information illustrated in FIG. 6, which is six-dimensional, and the state log information illustrated in FIG. 6, which is three-dimensional, as input data that is nine-dimensional in total, and detector 10 uses a predetermined machine learning method to map the nine-dimensional input data to two-dimensional data, separating items of observation data at timestamps "0.1", "0.2", "0.3", and "0.4" illustrated in FIG. 6.

The items of observation data at the timestamps "0.1", "0.2", "0.3", and "0.4" are mapped onto a two-dimensional space as illustrated in FIG. 7, for example. Here, the items of observation data at the timestamps "0.1" and "0.3" are included in a normal behavior group (a region enclosed with a broken line in FIG. 7) that is learned in advance, whereas the items of observation data at the timestamps "0.2" and "0.4" are not included in the normal behavior group learned in advance.

Specifically, as illustrated in FIG. 6, the number of occurrences of hook pointer A of a piece of the behavior log information at the timestamp "0.2" shows an anomalous value, "18". This is considered to be due to anomalous memory accesses that are made when the process control of application 14 is illegally taken over. The item of observation data at the timestamp "0.2" is thereby excluded from the normal behavior group learned in advance as illustrated in FIG. 7 because the number of occurrences of hook pointer A of the piece of the behavior log information at the timestamp "0.2" has an anomalous value. As a result, the likelihood indicated by the evaluation value falls below the threshold, which causes detector 10 to determine that the behavior of application 14 at the timestamp "0.2" is anomalous.

Further, as illustrated in FIG. 6, communication message A of a piece of the behavior log information at the timestamp "0.4" is "instruction for emergency brake", and a vehicle speed of a piece of the state log information at the timestamp "0.4" is "79 km/h". This is considered to be due to an issuance of an emergency brake API from application 14 to communicator 6 when the vehicle is traveling on the expressway. The item of observation data at the timestamp "0.4" is thereby excluded from the normal behavior group learned in advance as illustrated in FIG. 7 because communication message A of the piece of the behavior log information at the timestamp "0.4" is "instruction for emergency brake" and the vehicle speed of the piece of the state log information at the timestamp "0.4" is "79 km/h". As a result, the likelihood indicated by the evaluation value falls below the threshold, which causes detector 10 to determine that the behavior of application 14 at the timestamp "0.4" is anomalous.

[1-3. Advantageous Effects]

As described above, detector 10 detects an anomaly in a behavior of application 14 based on the behavior log information obtained and the state log information obtained as well as the determination criterion information stored in storage 8. This enables information processing device 2 to reliably detect an anomaly in a behavior of application 14 caused by an attack on the vehicle such as hacking, so that security measures for the vehicle can be enhanced.

Embodiment 2

[2-1. Configuration of Information Processing Device]

Figure 8:
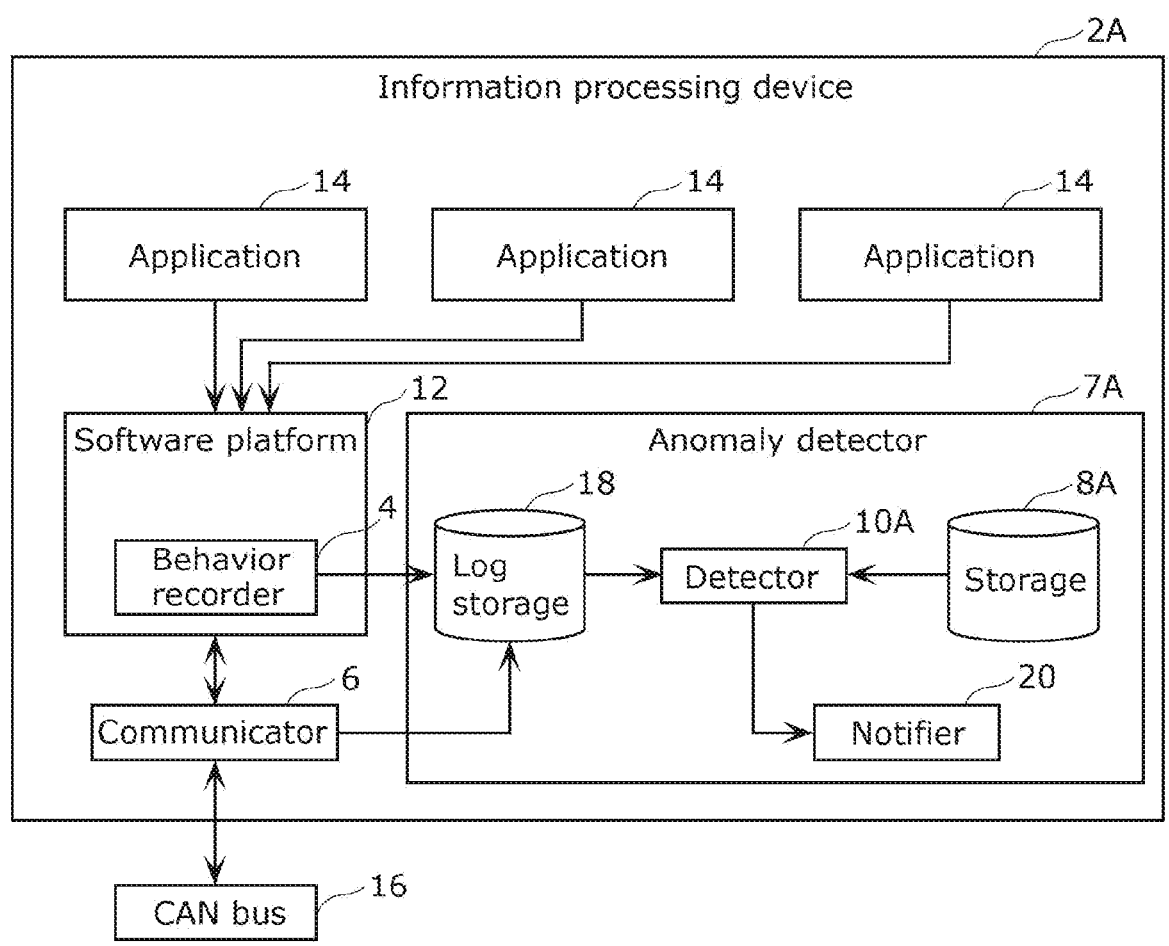
FIG. 8 is a block diagram illustrating a configuration of an information processing device according to Embodiment 2.
Figures 9, 10:
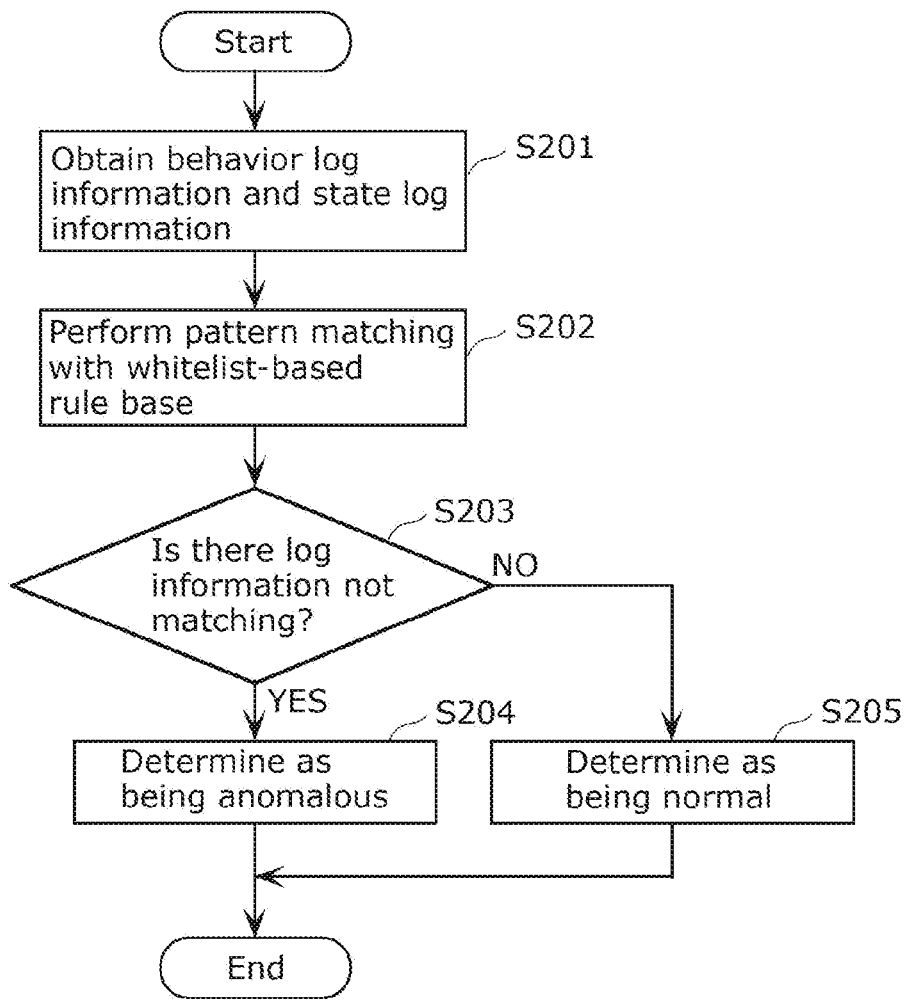
FIG. 9 is a diagram illustrating an example of determination criterion information according to Embodiment 2.
FIG. 10 is a flowchart indicating a flow of an operation by a detector of the information processing device according to Embodiment 2.

Next, a configuration of information processing device 2A according to Embodiment 2 will be described with reference to FIG. 8 and FIG. 9. FIG. 8 is a block diagram illustrating the configuration of information processing device 2A according to Embodiment 2. FIG. 9 is a diagram illustrating an example of determination criterion information according to Embodiment 2. It should be noted that, in the following embodiments, the same components as those in Embodiment 1 described above will be denoted by the same reference characters, and description of the components will not be repeated.

As illustrated in FIG. 8, anomaly detector 7A of information processing device 2A according to Embodiment 2 includes log storage 18 and notifier 20 in addition to the constituent components described in Embodiment 1.

Log storage 18 stores (accumulates) behavior log information from behavior recorder 4 and state log information from communicator 6. Detector 10A reads and obtains the behavior log information and the state log information that are stored in log storage 18, and based on the behavior log information obtained and the state log information obtained as well as the determination criterion information stored in storage 8A, detector 10A detects an anomaly in a behavior of application 14.

Notifier 20 notifies an outside (e.g., a terminal device of a user or an external server, etc.) that detector 10A has detected an anomaly in a behavior of application 14, when detector 10A detects the anomaly. This allows an action such as forcibly stopping application 14 having behaved anomalously to be performed.

Storage 8A stores in advance determination criterion information indicating a determination criterion for determining whether or not a behavior of application 14 is normal, and the determination criterion information is a whitelist-based rule base. That is, the determination criterion information includes a determination model, which is a rule-based model to be used in determining whether or not a behavior of application 14 is normal. Here, an example of the determination criterion information stored in storage 8A will be described with reference to FIG. 9. In the example illustrated in FIG. 9, the determination criterion information includes normal behavior log information indicating a history of normal behaviors of application 14 and normal state log information indicating a history of normal states of the vehicle, and the normal behavior log information and the normal state log information are defined for each event.

In what is called an event-driven manner, detector 10A detects an anomaly in a behavior of application 14 by comparing the behavior log information obtained with the normal behavior log information included in the determination criterion information and comparing the state log information obtained with the normal state log information included in the determination criterion information, for each event (e.g., every time a task is generated).

Specifically, if the behavior log information obtained matches the normal behavior log information included in the determination criterion information, and the state log information obtained matches the normal state log information included in the determination criterion information for all the events in the determination criterion information (event 1, event 2, . . . , event n), detector 10A detects that the behavior of application 14 is normal. In contrast, if the behavior log information (or the state log information) obtained does not match the normal behavior log information (or the normal state log information) included in the determination criterion information for any one of the events in the determination criterion information, detector 10A detects that the behavior of application 14 is anomalous.

[2-2. Operation by Detector]

Next, an operation by detector 10A will be described with reference to FIG. 10 and FIG. 11. FIG. 10 is a flowchart indicating a flow of the operation by detector 10A of information processing device 2A according to Embodiment 2. FIG. 11 is a diagram illustrating an example of the behavior log information and the state log information that are obtained by detector 10A of information processing device 2A according to Embodiment 2 and the determination criterion information stored in storage 8A of information processing device 2A.

The following description is about a case where application 14 is a carsharing application as a precondition and where a malicious third person exploits a vulnerability of application 14 and illegally takes process control of application 14. Here, customer information on a user (e.g., the customer information includes a user name and a history of usage of application 14, etc.) that has been registered via application 14 is supposed to be transmitted to an external server only at a start time of carsharing (when a vehicle is at rest (0 km/h)). However, application 14 being illegally taken over reads the customer information and transmits the customer information to an external server via communicator 6 at a timing other than the start time of carsharing (e.g., when the vehicle is traveling). This involves a risk that the customer information on the user is leaked out to the outside.

As illustrated in FIG. 10, detector 10A reads and obtains the behavior log information and the state log information from log storage 18 (S201). Here, detector 10A obtains, for example, behavior log information and state log information as illustrated in (a) in FIG. 11. In the example illustrated in (a) in FIG. 11, the behavior log information includes a) Timestamp, b) Process ID, c) Hook pointer name, d) Hook pointer attribute 1, and e) Hook pointer attribute 2. The state log information includes a) Timestamp, b) Vehicle speed, c) Acceleration, and d) Steering angle.

Detector 10A performs pattern matching between the determination criterion information that is a whitelist-based rule base and stored in storage 8A, and the behavior log information obtained and the state log information obtained (S202). Here, storage 8A stores, for example, determination criterion information that is a whitelist-based rule base as illustrated in (b) in FIG. 11. In the example illustrated in (b) in FIG. 11, the normal behavior log information in the determination criterion information includes a) Timestamp, b) Hook pointer name, c) Hook pointer attribute 1, and d) Hook pointer attribute 2. The normal state log information in the determination criterion information includes a) Timestamp and b) Vehicle speed.

If there is a piece of behavior log information (or the state log information) that does not match any piece of the normal behavior log information (or the normal state log information) in the determination criterion information being a whitelist-based rule base (YES in S203), detector 10A determines that the behavior of application 14 is anomalous (S204). If there is no piece of the behavior log information (or the state log information) that does not match any piece of the behavior log information (or the state log information) in the determination criterion information being a whitelist-based rule base (YES in S203), detector 10A determines that the behavior of application 14 is normal (S205).

Here, processing in step S203 described above will be described in detail with reference to FIG. 11. In the example illustrated in FIG. 11, for each event, detector 10A performs the pattern matching between hook pointer names, hook pointer attributes 1, and hook pointer attributes 2 included in the behavior log information, and hook pointer names, hook pointer attributes 1, and hook pointer attributes 2 included in the normal behavior log information in the determination criterion information, and performs the pattern matching between vehicle speeds included in the state log information and vehicle speeds included in the normal state log information in the determination criterion information.

As illustrated in FIG. 11, in event 1, there is no piece of the behavior log information and/or the state log information that matches any piece of the determination criterion information, and thus detector 10A determines that the behavior of application 14 is normal.

In event 2, hook pointer attribute 1 "fileB" and hook pointer attribute 2 "write" in a piece of the behavior log information do not match hook pointer attribute 1 "fileA" and hook pointer attribute 2 "read" in a corresponding piece of the normal behavior log information in the determination criterion information, respectively. This is considered to be due to an unusual write to a file. Thus, there is a piece of the behavior log information that does not match any piece of the normal behavior log information in the determination criterion information, and thus detector 10A determines that the behavior of application 14 in event 2 is anomalous.

In event 3, hook pointer attribute 1 "communication device" and hook pointer attribute 2 "data transmission" in a piece of the behavior log information match hook pointer attribute 1 "communication device" and hook pointer attribute 2 "data transmission" in a corresponding piece of the normal behavior log information in the determination criterion information, respectively, but a vehicle speed "57 (km/h)" in a corresponding piece of the state log information does not match a vehicle speed "0 (km/h)" in a corresponding piece of the normal state log information in the determination criterion information. This is considered to be due to transmission of the customer information to an external server at a timing (when the vehicle is traveling) other than the start time of the carsharing (when the vehicle is at rest). Thus, there is a piece of the state log information that does not match any piece of the normal state log information in the determination criterion information, and thus detector 10A determines that the behavior of application 14 in event 3 is anomalous.

Accordingly, the present embodiment can also provide the same advantageous effect as in Embodiment 1 described above.

[2-3. Other Examples of Attacking Vehicle]

Other Attack examples 1 to 3 of attacking a vehicle will be described below.

[2-3-1. Attack Example 1]

As Attack example 1, a case where application 14 is a driving automation application as a precondition and where a malicious third person exploits a vulnerability of application 14 and illegally takes process control of application 14 will be described.

In this case, application 14 obtains sensor information from a sensor provided to a vehicle so as to present information regarding a state of the vehicle to a user. It should be noted that the sensor is, for example, a light detection and ranging (LiDAR) sensor, a millimeter-wave sensor, an image sensor, or the like for detecting objects existing around the vehicle.

In this case, application 14 being illegally taken over seizes a privilege of transmitting sensor information that application 14 is originally not permitted, and application 14 transmits improper sensor information via communicator 6 to, for example, an ADAS of the vehicle. The improper sensor information refers to, for example, sensor information that indicates a detection of a vehicle present ahead despite absence of such vehicle ahead. The ADAS receiving the improper sensor information from application 14 may induce an erroneous operation of the vehicle.

Also in Attack example 1, detector 10A detects an anomaly in the behavior of application 14 based on the behavior log information obtained and the state log information obtained as well as the determination criterion information stored in storage 8A. Specifically, detector 10A determines that the behavior of application 14 is anomalous because a piece of state log information based on the improper sensor information (e.g., a piece of state log information indicating "vehicle present ahead") is different from a piece of state log information based on another piece of sensor information (e.g., a piece of state log information indicating "no vehicle present ahead").

[2-3-2. Attack Example 2]

As Attack example 2, a case where application 14 is a delivery box application as a precondition and where a malicious third person exploits a vulnerability of application 14 and illegally takes process control of application 14 will be described. Here, application 14 is used only when the vehicle is at rest (0 km/h) and is not used when the vehicle is traveling.

In this case, application 14 being illegally taken over executes an authentication process for unlocking a trunk of the vehicle and issues, to communicator 6, an API for instructions to unlock the trunk of the vehicle. This involves a risk that the trunk of the vehicle is unlocked to open unexpectedly when the vehicle is traveling Also in Attack example 2, detector 10A detects an anomaly in the behavior of application 14 based on the behavior log information obtained and the state log information obtained as well as the determination criterion information stored in storage 8A. Specifically, detector 10A determines that the behavior of application 14 is anomalous because hook pointer attribute 1 "execution of authentication process (of delivery box application)" in a piece of the state log information matches hook pointer attribute 1 "execution of authentication process (of delivery box application)" in a piece of the normal state log information in the determination criterion information, but a vehicle speed "57 (km/h)" in the piece of the state log information does not match a vehicle speed "0 (km/h)" in the piece of the normal state log information in the determination criterion information.

[2-3-3. Attack Example 3]

As Attack example 3, a case where application 14 is an advertisement distribution application as a precondition and where a malicious third person exploits a vulnerability of application 14 and illegally takes process control of application 14 will be described. Here, application 14 operates to display an advertisement to a user mainly when the vehicle is at rest (0 km/h) and seldom operates when the vehicle is traveling.

In this case, application 14 being illegally taken over downloads and installs a mining tool and carries out a computation placing a heavy load. This involves a risk that resources of a central processing unit (CPU) are exhausted, adversely affecting operations of other applications 14.

Also in Attack example 3, detector 10A detects an anomaly in the behavior of application 14 based on the behavior log information obtained and the state log information obtained as well as the determination criterion information stored in storage 8A. Specifically, detector 10A determines that the behavior of application 14 is anomalous because the number of occurrences of hook pointer A in a piece of the state log information having a vehicle speed "57 (km/h)" is anomalous.

Embodiment 3

[3-1. Configuration of Information Processing Device]

Figure 12:
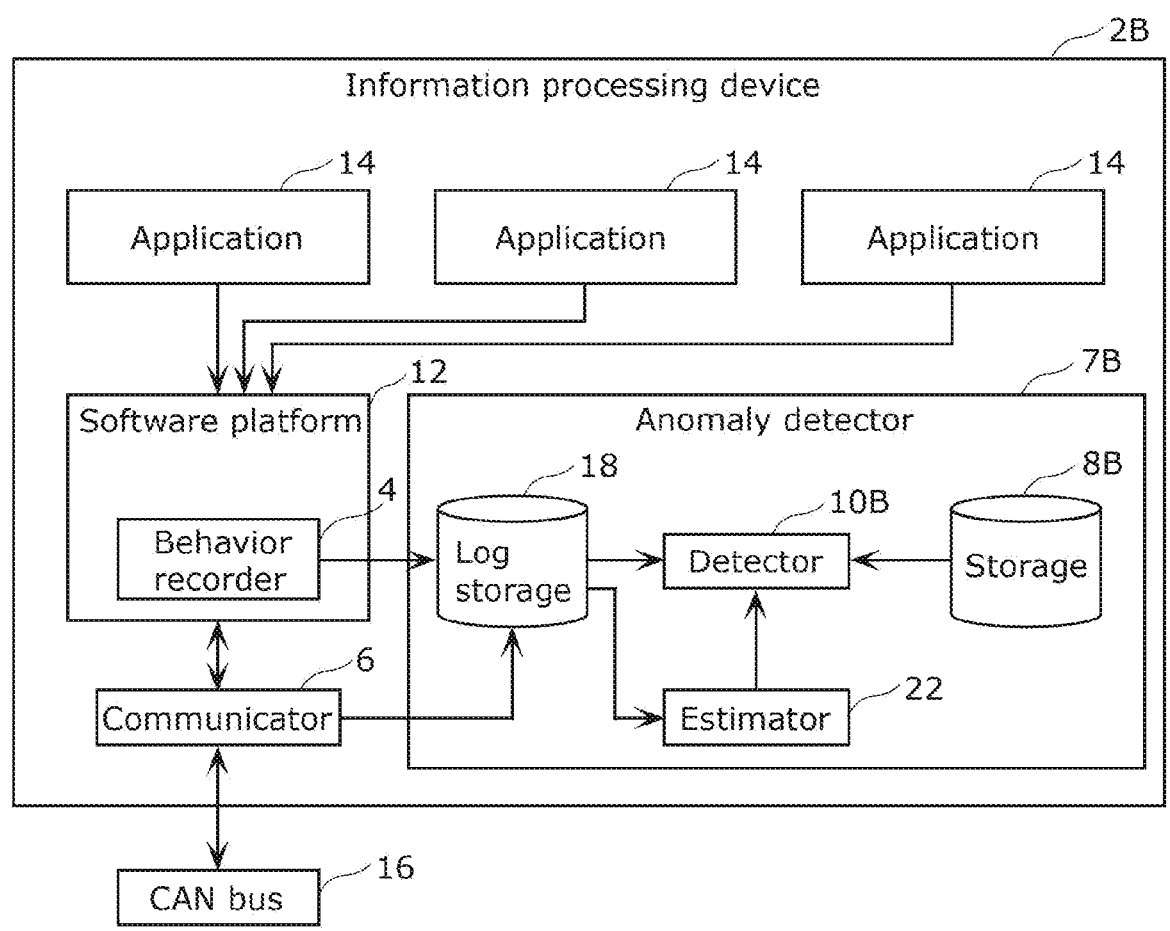
FIG. 12 is a block diagram illustrating a configuration of an information processing device according to Embodiment 3.

Next, a configuration of information processing device 2B according to Embodiment 3 will be described with reference to FIG. 12. FIG. 12 is a block diagram illustrating the configuration of information processing device 2B according to Embodiment 3.

As illustrated in FIG. 12, anomaly detector 7B of information processing device 2B according to Embodiment 3 includes log storage 18 and estimator 22 in addition to the constituent components described in Embodiment 1. Log storage 18 has been described in detail in Embodiment 2, and the description of log storage 18 will not be repeated.

Estimator 22 estimates a state of a vehicle based on state log information stored in log storage 18. Examples of the state of the vehicle include a vehicle speed, an acceleration, and a steering angle of the vehicle. Estimator 22 outputs a result of the estimation to detector 10B.

Storage 8B stores in advance determination criterion information indicating a determination criterion for determining whether or not a behavior of application 14 is normal, and the determination criterion information is a blacklist-based rule base. That is, the determination criterion information includes a determination model, which is a rule-based model to be used in determining whether or not a behavior of application 14 is normal. The determination criterion information includes anomalous behavior log information indicating a history of anomalous behaviors of application 14 and anomalous state log information indicating a history of anomalous states of the vehicle, and the anomalous behavior log information and the anomalous state log information are defined for each event.

In what is called an event-driven manner, detector 10B detects an anomaly in a behavior of application 14 by comparing the behavior log information obtained with the anomalous behavior log information included in the determination criterion information and comparing the state log information obtained with the anomalous state log information included in the determination criterion information, for each event. Further, detector 10B detects the anomaly in the behavior of application 14 with further consideration to a result of the estimation performed by the estimator.

[3-2. Operation by Detector]

Figure 13:
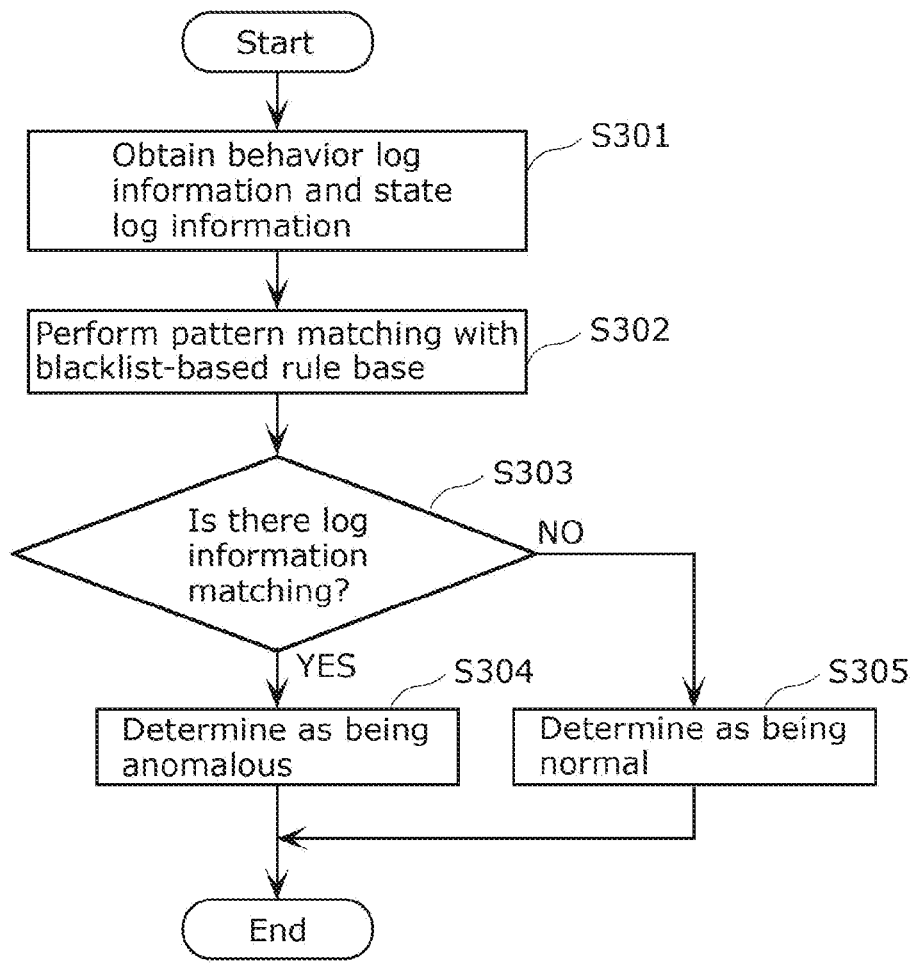
FIG. 13 is a flowchart indicating a flow of an operation by a detector of the information processing device according to Embodiment 3.

Next, an operation by detector 10B will be described with reference to FIG. 13. FIG. 13 is a flowchart indicating a flow of the operation by detector 10B of information processing device 2B according to Embodiment 3.

As illustrated in FIG. 13, detector 10B reads and obtains the behavior log information and the state log information from log storage 18 (S301). Detector 10B performs pattern matching between the determination criterion information that is a blacklist-based rule base and stored in storage 8B, and the behavior log information obtained and the state log information obtained (S302).

If there is a piece of the behavior log information (or the state log information) that matches any piece of the anomalous behavior log information (or the anomalous state log information) in the determination criterion information being a blacklist-based rule base (YES in S303), detector 10B determines that the behavior of application 14 is anomalous (S304). If there is no piece of the behavior log information (or the state log information) that matches any piece of the anomalous behavior log information (or the anomalous state log information) in the determination criterion information being a blacklist-based rule base (NO in S303), detector 10B determines that the behavior of application 14 is normal (S305).

Accordingly, the present embodiment can also provide the same advantageous effect as in Embodiment 1 described above.

Embodiment 4

Figure 14:
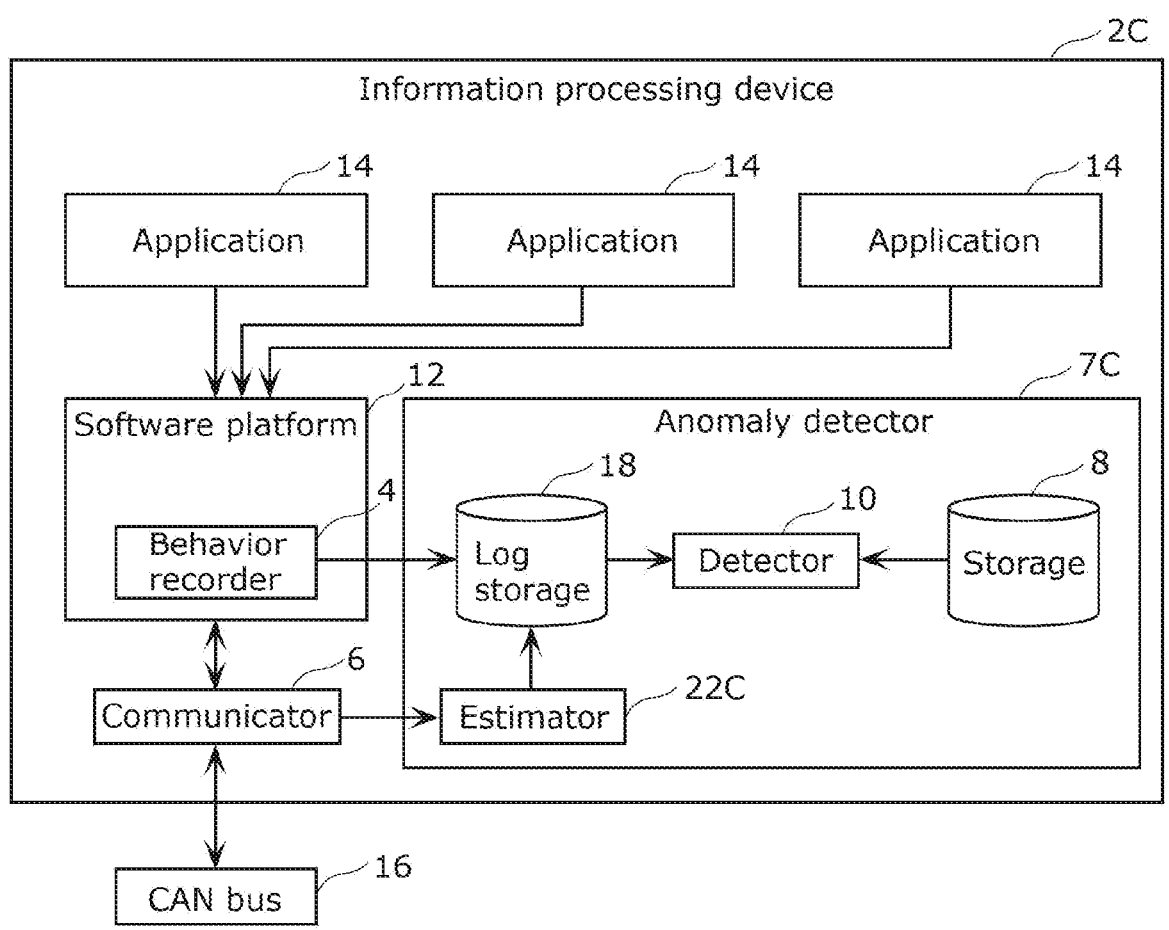
FIG. 14 is a block diagram illustrating a configuration of an information processing device according to Embodiment 4.

Next, a configuration of information processing device 2C according to Embodiment 4 will be described with reference to FIG. 14. FIG. 14 is a block diagram illustrating the configuration of information processing device 2C according to Embodiment 4.

As illustrated in FIG. 14, anomaly detector 7C of information processing device 2C according to Embodiment 4 includes log storage 18 and estimator 22C in addition to the constituent components described in Embodiment 1. Log storage 18 has been described in detail in Embodiment 2, and the description of log storage 18 will not be repeated.

Estimator 22C estimates a state of a vehicle based on state log information received by communicator 6. Estimator 22C causes log storage 18 to store a result of the estimation as a piece of state log information. It should be noted that estimator 22C may perform filtering on a plurality of pieces the state log information received by communicator 6 to select only pieces of the state log information that are useful for detecting an anomaly in application 14. In this case, estimator 22C estimates the state of the vehicle based on the selected pieces of the state log information.

Accordingly, the present embodiment can also provide the same advantageous effect as in Embodiment 1 described above.

Embodiment 5

Figure 15:
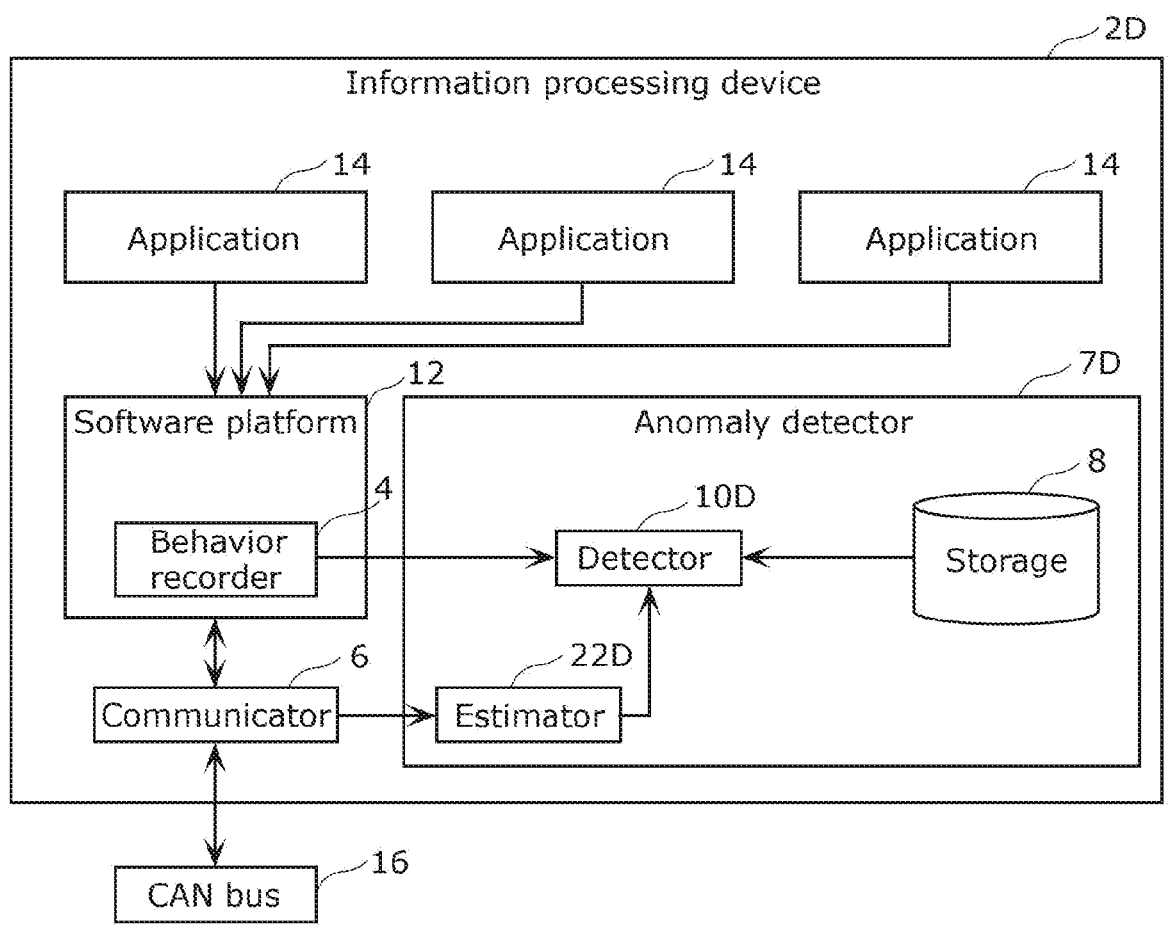
FIG. 15 is a block diagram illustrating a configuration of an information processing device according to Embodiment 5.

Next, a configuration of information processing device 2D according to Embodiment 5 will be described with reference to FIG. 15. FIG. 15 is a block diagram illustrating the configuration of information processing device 2D according to Embodiment 5.

As illustrated in FIG. 15, anomaly detector 7D of information processing device 2D according to Embodiment 5 includes estimator 22D in addition to the constituent components described in Embodiment 1. Estimator 22D estimates a state of a vehicle based on state information received by communicator 6. Estimator 22D outputs a result of the estimation to detector 10D as a piece of the state information. It should be noted that estimator 22D may perform filtering on a plurality of pieces of the state information received by communicator 6 to select only pieces of the state information that are useful for detecting an anomaly in application 14. In this case, estimator 22D estimates the state of the vehicle based on the selected pieces of the state information.

Detector 10D obtains behavior information from behavior recorder 4 and the state information (the result of the estimation) from estimator 22D. Based on the behavior information obtained and the state information obtained as well as determination criterion information stored in storage 8, detector 10D detects an anomaly in a behavior of application 14.

It should be noted that the state information and the behavior information are each not necessarily log information; for example, an anomaly can be detected based on a history of the behavior information and a piece of the state information at a timing, or an anomaly can be detected based on a piece of the behavior information at a timing and a history of the state information.

Accordingly, the present embodiment can also provide the same advantageous effect as in Embodiment 1 described above.

Variations Etc

Although the information processing device and the control method according to one or more aspects of the present disclosure have been described based on embodiments, they are not limited to these embodiments. Those skilled in the art will readily appreciate that embodiments arrived at by making various modifications to the above embodiments, or embodiments arrived at by selectively combining elements disclosed in the above embodiments without materially departing from the scope of the present disclosure may be included within one or more aspects of the present disclosure.

The descriptions of the above-described embodiments have been given of the application of the information processing device according to the present disclosure to security measures in an in-vehicle network provided in a vehicle such as an automobile as an application example of the information processing device; however, a scope of application of the information processing device according to the present disclosure is not limited to this. The information processing device according to the present disclosure may be applied not only to a vehicle such as an automobile but also to any mobility such as a construction machine, an agricultural machine, a vessel, a railroad vehicle, and an airplane.

Although communicator 6 is connected to CAN bus 16 in the embodiments described above, communicator 6 may be connected to, for example, any in-vehicle network such as Ethernet (R) and FlexRay (R) or may be connected to a virtual machine other than software platform 12.

Each of the elements in each of the above embodiments may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory.

It should also be noted that a part or all of the functions in the information processing device according to each of the above-described embodiments may be implemented by executing a program by a processor such as a CPU.

It should also be noted that a part or all of the constituent elements included in each of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

The present disclosure may be the above-above described methods. These methods may be a computer program executed by a computer, or digital signals forming the computer program. The present disclosure may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-ray (registered) Disc), and a semiconductor memory. The present disclosure may be the digital signals recorded on the recording medium. The present disclosure may be implemented by transmitting the computer program or the digital signals via an electric communication line, a wired or wireless communication line, a network represented by the Internet, data broadcasting, and the like. The present disclosure may be a computer system including a microprocessor and a memory. The memory stores the computer program and the microprocessor operates according to the computer program. It is also possible that the program or the digital signals may be recorded onto the recording medium to be transferred, or may be transmitted via a network or the like, so that the program or the digital signals can be executed by a different independent computer system.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2019-220231 filed on Dec. 5, 2019 and PCT International Application No. PCT/JP2020/032015 filed on Aug. 25, 2020.

INDUSTRIAL APPLICABILITY

The present disclosure is applicable to, for example, an information processing device and the like for detecting an anomaly in an application that operates on an in-vehicle device of a vehicle.

The invention claimed is:

1. An information processing device that is connected to a mobility network, the mobility network being provided to a mobility, the information processing device comprising:
a memory that stores determination criterion information indicating a determination criterion for determining whether or not a behavior of an application operating on a device provided to the mobility is normal; and
a processor that obtains behavior information indicating the behavior of the application, and detects an anomaly in the behavior of the application based on (i) state information that indicates a state of the mobility and is obtained via the mobility network, (ii) the behavior information obtained, and (iii) the determination criterion information stored in the memory, wherein the determination criterion information includes a determination model that is generated in advance by machine learning to be used in determining a likelihood that the behavior of the application is normal, and the processor:

calculates, using the determination model, (i) a first feature amount from a history of the behavior information obtained and (ii) a second feature amount from a history of the state information obtained;

calculates an evaluation value indicating the likelihood from the first feature amount calculated and the second feature amount calculated; and compares the likelihood indicated by the evaluation value with a threshold to detect the anomaly in the behavior of the application.

2. The information processing device according to claim 1, wherein the processor estimates the state of the mobility based on the state information, and the processor detects the anomaly in the behavior of the application with further consideration to a result of an estimation of the state of the mobility.

3. The information processing device according to claim 1, wherein the processor notifies an outside of the information processing device that the anomaly in the behavior of the application is detected, when the processor detects the anomaly.

4. A control method performed by an information processing device that is connected to a mobility network, the mobility network being provided to a mobility, the control method comprising:

storing, by a memory, determination criterion information indicating a determination criterion for determining whether or not a behavior of an application operating on a device provided to the mobility is normal;

obtaining behavior information indicating the behavior of the application operating on the device provided to the mobility; and detecting, by a processor, an anomaly in the behavior of the application based on (i) state information that indicates a state of the mobility and is obtained via the mobility network, (ii) the behavior information obtained, and (iii) determination criterion information stored in advance in the memory, wherein the determination criterion information includes a determination model that is generated in advance by machine learning to be used in determining a likelihood that the behavior of the application is normal, and in the detecting, the processor:

calculates, using the determination model, (i) a first feature amount from a history of the behavior information obtained and (ii) a second feature amount from a history of the state information obtained;

calculates an evaluation value indicating the likelihood from the first feature amount calculated and the second feature amount calculated; and compares the likelihood indicated by the evaluation value with a threshold to detect the anomaly in the behavior of the application.

* * * * *